United States Patent [19]

Shibahata

[11] Patent Number: 4,973,296
[45] Date of Patent: Nov. 27, 1990

[54] APPARATUS FOR DRIVING A PAIR OF MOTOR VEHICLE ROAD WHEELS

[75] Inventor: Yasuji Shibahata, Tochigi, Japan

[73] Assignee: Honda Giken Kogyo Kabushiki Kaisha, Tokyo, Japan

[21] Appl. No.: 295,339

[22] Filed: Jan. 10, 1989

[30] Foreign Application Priority Data

Jan. 11, 1988 [JP] Japan .................................... 63-3490

[51] Int. Cl.⁵ .............................................. F16H 1/44
[52] U.S. Cl. ..................................................... 475/231
[58] Field of Search ....... 74/665 GB, 665 GC, 665 T, 74/710.5, 711

[56] References Cited

U.S. PATENT DOCUMENTS

| | | | |
|---|---|---|---|
| 1,361,963 | 12/1920 | Carlberg | 475/237 |
| 1,938,457 | 12/1933 | McCaffery | 74/711 |
| 2,353,554 | 7/1944 | Gates | 74/655 T X |
| 2,689,488 | 9/1954 | Storer, Jr. et al. | 74/710.5 |
| 2,749,774 | 6/1956 | Gates | 74/710.5 |
| 3,044,320 | 7/1962 | Oudry | 74/710.5 |
| 3,405,574 | 10/1968 | Livezey | 74/665 T X |
| 3,601,211 | 8/1971 | Finke | 74/710.5 X |
| 4,258,585 | 3/1981 | Orshansky, Jr. et al. | 74/710.5 X |
| 4,377,094 | 3/1983 | Thompson et al. | 74/710.5 |
| 4,549,448 | 10/1985 | Kittle | 74/710.5 |
| 4,722,243 | 2/1988 | Giere | 74/710.5 |

FOREIGN PATENT DOCUMENTS

| | | |
|---|---|---|
| 0248582 | 12/1987 | European Pat. Off. . |
| 178007 | 3/1954 | Fed. Rep. of Germany ..... 74/710.5 |
| 180484 | 12/1954 | Fed. Rep. of Germany ..... 74/710.5 |
| 3419149 | 11/1985 | Fed. Rep. of Germany . |
| 3635406 | 4/1987 | Fed. Rep. of Germany . |
| 3703353 | 7/1987 | Fed. Rep. of Germany . |
| 3706075 | 8/1987 | Fed. Rep. of Germany . |
| 3617074 | 11/1987 | Fed. Rep. of Germany . |
| 3720459 | 12/1987 | Fed. Rep. of Germany . |
| 3620924 | 1/1988 | Fed. Rep. of Germany . |
| 3703354 | 3/1988 | Fed. Rep. of Germany . |
| 7903603 | 9/1979 | France . |
| 51-171143 | 10/1982 | Japan .................................. 74/711 |
| 62-203825 | 9/1987 | Japan . |
| 62-203826 | 9/1987 | Japan . |
| WO85/4229 | 9/1985 | PCT Int'l Appl. ................... 74/711 |
| 1043042 | 9/1983 | U.S.S.R. ............................ 74/710.5 |

Primary Examiner—Dirk Wright
Attorney, Agent, or Firm—Armstrong, Nikaido, Marmelstein, Kubovcik & Murray

[57] ABSTRACT

An apparatus for driving a pair of laterally spaced road wheels of a motor vehicle includes a first torque transmitting device for transmitting a drive torque from a power source to the road wheels, the first torque transmitting device including a differential for distributing the drive torque to the road wheels, and a second torque transmitting device for transmitting the drive torque from the power source to the road wheels in bypassing relation to the differential, the second torque transmitting means including clutches for varying amounts of torque to be transmitted to the road wheels. A control circuit controls the clutches to vary the amounts of torque dependent on an operating condition of the motor vehicle.

12 Claims, 8 Drawing Sheets

APPARATUS FOR DRIVING A PAIR OF MOTOR VEHICLE ROAD WHEELS

BACKGROUND OF THE INVENTION

1. Field of the Invention:

The present invention relates to a motor vehicle road wheel driving apparatus, and more particularly to an apparatus for driving a pair of lefthand and righthand road wheels of a motor vehicle.

2. Description of the Relevant Art:

Motor vehicles have a mechanical differential coupled between a pair of lefthand and righthand drive road wheels for distributing equal torques from the engine to the drive road wheels. When one of the drive road wheels is caused to rotate idly, however, no engine torque is transmitted to the other drive road wheels, failing to drive the drive road wheels for propelling the motor vehicle. Such a problem can be eliminated by employing a limited-slip differential which combines a normal mechanical differential with a differential motion limiting capability. With the limited-slip differential, while the motor vehicle is making a turn, the drive torque is transmitted from an outer drive road wheel which rotates faster to an inner drive road wheel which rotates slower. The drive torque applied to the inner drive road wheel is therefore increased to produce a moment counteracting the moment which tends to turn the motor vehicle. As a result, the ability of the motor vehicle to make turns, or turning performance, is lowered.

SUMMARY OF THE INVENTION

According to the present invention, there is provided an apparatus for driving a pair of laterally spaced road wheels of a motor vehicle, comprising: a power source for producing a drive torque to drive the road wheels; first torque transmitting means for transmitting the drive torque from said power source to the road wheels, said first torque transmitting means including a differential for distributing the drive torque to the road wheels; second torque transmitting means for transmitting the drive torque from said power source to the road wheels in bypassing relation to said differential, said second torque transmitting means including clutch means for varying amounts of torque to be transmitted to the road wheels; and control means for controlling said clutch means to vary said amounts of torque dependent on an operating condition of the motor vehicle.

While the motor vehicle is making a turn in low and medium speed ranges, hydraulic pressure is applied to a torque transmitting clutch associated with an outer road wheel on the turning circle by the control means, drive power from the power source is transmitted through the torque transmitting clutch to the outer road wheel with a rotational speed higher than the rotational speed which is transmitted through the differential. Therefore, the torque applied to drive the outer road wheel becomes higher than the torque applied to drive the inner road wheel for improved turning performance of the motor vehicle.

During a turn which the motor vehicle makes in high speed range, the drive torque applied to the outer road wheel is increased so a to be greater than the drive torque applied to the inner road wheel for increased running stability of the motor vehicle.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
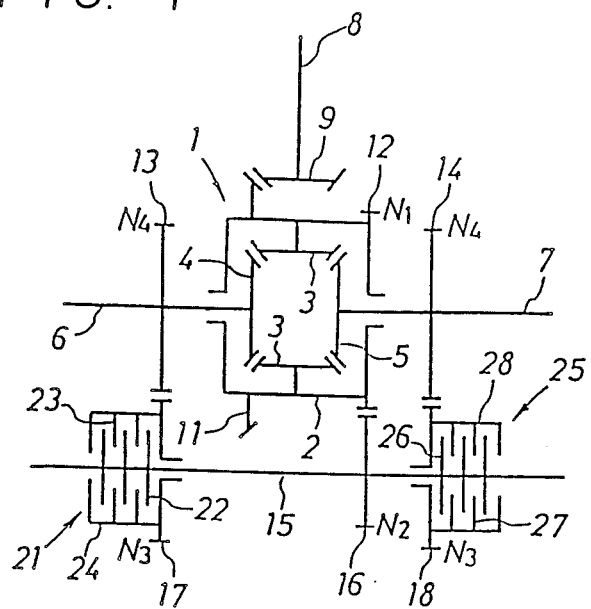
FIG. 1 is a schematic view of a drive mechanism of an apparatus for driving a pair of road wheels according to the present invention.

As shown in FIG. 1, an apparatus for driving a pair of motor vehicle road wheels includes a drive mechanism having a mechanical differential 1 which comprises a differential case 2, a pair of pinions 3 supported in the differential case 2, a pair of side gears 4, 5 meshing with the pinions 3, and a pair of output shafts 6, 7 connected to a pair of laterally spaced road wheels (not shown in FIG. 1), respectively, and also to the side gears 4, 5, respectively. A power transmitting shaft 8 coupled to an engine (not shown) is coupled to a gear 9 meshing with a gear 11 integral with the differential case 2. The differential 1 and the power transmitting shaft 8 jointly constitute a first torque transmitting device. Drive power from the engine is varied in speed by a transmission (not shown) and applied via the power transmitting shaft 8 and the gears 9, 11 to the differential case 2, from which the drive power is distributed via the pinion 3 and the side gears 4, 5 to the output shafts 6, 7 for driving the road wheels coupled to the output shafts 6, 7.

A gear 12 is integrally formed with the differential case 2, and gears 13, 14 are also integrally formed with the output shafts 6, 7. A countershaft 15 is disposed parallel to the output shafts 6, 7 and has an integral gear 16 meshing with the gear 12. Gears 17, 18 held in mesh with the gears 13, 14, respectively, are rotatably mounted on the countershaft 15 through respective torque transmitting clutches 21, 25, which are in the form of hydraulic multiplate clutches capable of varying the amount of torque transmitted therethrough.

The torque transmitting clutches 21, 25 have respective sets of inner plates 22, 26 securely mounted on the countershaft 15 at its laterally spaced portions, and also respective sets of outer plates 23, 27 fixed to and held in respective drums 24, 28 which are integral with the respective gears 17, 18. The inner plates 22, 26 alternate with the outer plates 23, 27, respectively.

The gears 13, 14 have the same diameter and the same number of teeth as each other, and the gears 17, 18 also have the same diameter and the same number of teeth as each other.

Rotation from the power transmitting shaft 8 is transmitted through the differential case 2 to the countershaft 15 through the gears 12, 16. The gears 12, 16 have respective numbers $N_1$, $N_2$ of teeth. Rotation of the countershaft 15 is transmitted through the torque transmitting clutches 21, 25 to the output shafts 6, 7, respectively, through the meshing gears 17, 13 and the meshing gears 18, 14, respectively. The gears 17, 13 and the gears 18, 14 have respective numbers $N_3$, $N_4$. These numbers of teeth have the following relationship:

$$\frac{N_1}{N_2} \cdot \frac{N_3}{N_4} > 1.0$$

The gears 12, 16, the countershaft 15, the gears 17, 13 and 18, 14 jointly constitute a second torque transmitting device for transmitting drive power from the engine to the output shafts 6, 7 and hence the road wheels in bypassing relation to the differential 1.

As described later on, the oil pressures supplied respectively to the hydraulic multiplate clutches 21, 25 are controlled dependent on a detected operating condition of the motor vehicle such as a turning condition thereof.

Figure 2:
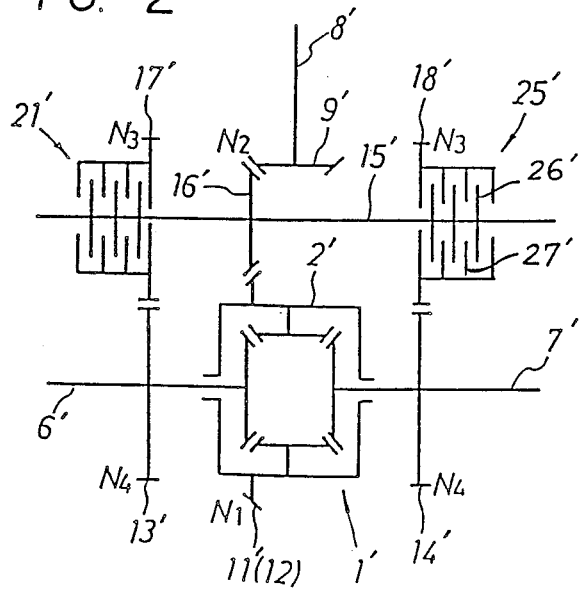
FIG. 2 is a schematic view of a modified drive mechanism with a differential and a countershaft which are differently positioned.

FIG. 2 shows a modified drive mechanism in which a differential and a countershaft are positioned differently from those shown in FIG. 1. As shown in FIG. 2, a countershaft 15' is disposed between a power transmitting shaft 8' and a differential 1', so that rotation from the power transmitting shaft 8' is transmitted from a gear 9' coupled to the countershaft 8' via a gear 16' mounted on the countershaft 15' and a gear 11' (which doubles as the gear 12 in FIG. 1) to a differential case 2'. The rotative power is then transmitted from the countershaft 15' through a hydraulic multiplate clutch 21' and gears 17', 13' to an output shaft 6' and also through a hydraulic multiplate clutch 25' and gears 18', 14' to an output shaft 7'.

Figure 3:
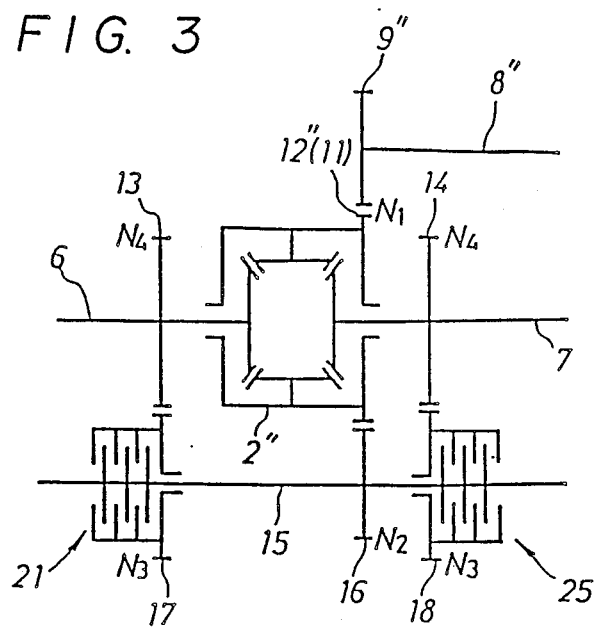
FIG. 3 is a schematic view of a modified drive mechanism with a differently positioned power transmitting shaft coupled to a differential.

FIG. 3 shows another modified drive mechanism in which a power transmitting shaft is differently positioned. A power transmitting shaft 8" which extends transversely of a motor vehicle has a gear 9" meshing directly with a gear 12" (which doubles as the gear 11 shown in FIG. 1) of a differential case 2". The other structural details are the same as those of FIG. 1.

When a hydraulic pressure is applied to only the righthand side hydraulic multiplate clutch 25 in FIG. 1, frictional engagement between the inner and outer plates 26, 27 is increased, thereby engaging the clutch 25. Therefore, the rotation of the countershaft 15 is transmitted through the gears 18, 14 to the output shaft 7 coupled to the road wheel.

From the above relationship between the numbers $N_1$, $N_2$, $N_3$, $N_4$ of teeth of the respective gears 12, 16, 18, 14, the following inequality is derived:

$$\frac{N_4}{N_3} < \frac{N_1}{N_2}$$

Therefore, the rotational speed of the output shaft 7 coupled to the righthand road wheel becomes higher than the rotational speed of the output shaft 6 coupled to the lefthand road wheel which rotates in unison with the side gear 4 of the differential 1. Thus, the road wheel driving apparatus of the present invention has an ability to increase the rotational speed of a selected road wheel.

Figure 4:
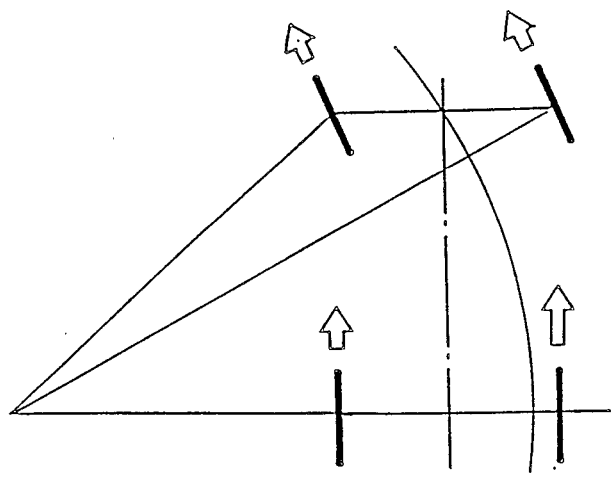
FIG. 4 is a schematic view showing the manner in which the apparatus of the invention operates while a motor vehicle is making a turn.

The difference between the rotational speeds of the output shafts 6, 7 is absorbed by the pinions 3 as they rotate. The lefthand hydraulic multiplate clutch 21 to which no hydraulic pressure is applied is idly rotating, i.e., the inner and outer plates 22, 23 are not engaging each other.

Where the driving apparatus of the present invention is incorporated in a rear-wheel drive motor vehicle (e.g., a front-engine rear-drive motor (FR) vehicle, a rear-engine rear-drive (RR) motor vehicle, or a midship-engine rear-drive (MR) motor vehicle), when the motor vehicle is making a turn as shown in FIG. 4, the torque applied to drive the outer rear road wheel (with respect to the turning circle) is increased so as to be greater than the torque applied to drive the inner rear road wheel by the ability of the road wheel driving apparatus to increase the rotational speed of the selected road wheel which is the outer rear road wheel here. The turning performance of the motor vehicle running in middle and lower speed ranges can thus be improved.

Conversely, it is possible for the road wheel driving apparatus to increase the torque applied to drive the inner rear road wheel (with respect to a turning circle) so as to be higher than the torque applied to drive the outer rear road wheel, so that the motor vehicle can run highly stably in a high speed range.

The road wheel driving apparatus according to the present invention can also be employed in a front-engine front-drive (FF) motor vehicle, or may be combined with the rear road wheels or the front road wheels or the front and rear road wheels of a front- and rear-wheel-drive (4WD) motor vehicle.

Figure 5:
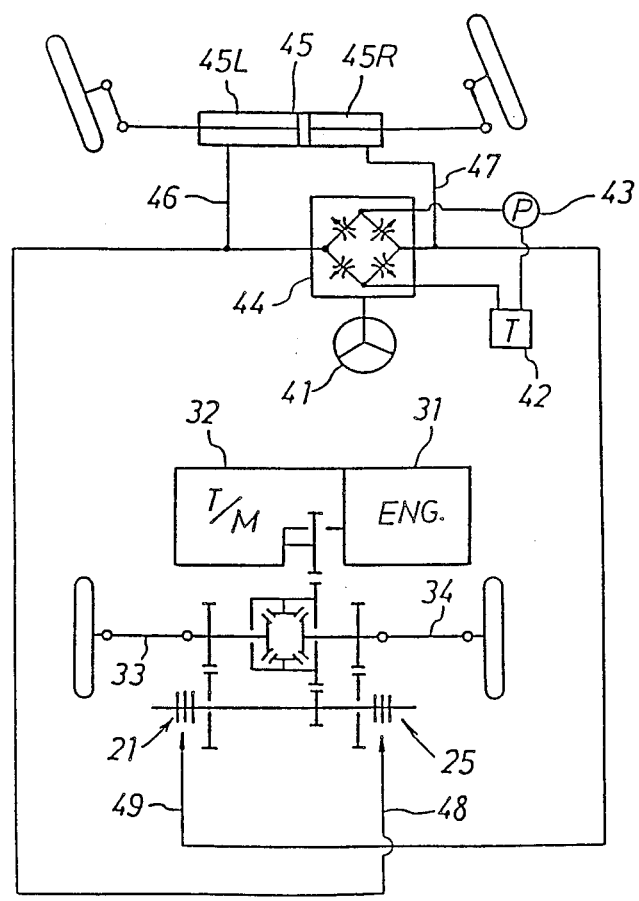
FIG. 5 is a schematic view of a rear-drive motor vehicle with a midship engine incorporating the principles of the present invention, the view also showing a hydraulic circuit.

FIG. 5 shows a road wheel driving apparatus of the invention, similar to the structure shown in FIG. 3, which is incorporated in a midship-engine rear-wheel (MR) motor vehicle, the view also showing a hydraulic circuit. The motor vehicle has an engine 31, a transmission 32, rear wheel drive shafts or axles 33, 34, a steering wheel 41, a power steering system for assisting in turning the steering wheel 41, the power steering system including an oil tank 42, an oil pump 43, a four-way directional control valve 44, and a power cylinder 45.

The power cylinder 45 has two hydraulic pressure chambers 45L, 45R which are connected to the directional control valve 44 through oil passages 46, 47 from which branch passages 48, 49 extend, respectively. The branch passage 48 is connected to the righthand hydraulic multiplate clutch 25, whereas the branch passage 48 is connected to the lefthand hydraulic multiplate clutch 21.

When the steering wheel 41 is turned to steer the motor vehicle for a left turn, for example, the four-way directional control valve 44 provides fluid communication between the pump 43 and the lefthand hydraulic pressure chamber 45L through the oil passage 46, and also between the righthand hydraulic pressure chamber 45R and the tank 42 through the oil passage 47. Therefore, the oil pressure in the lefthand hydraulic pressure chamber 45L increases, and the oil pressure in the righthand hydraulic pressure chamber 45R decreases. At this time, the pump 43 also communicates with the righthand hydraulic multiplate clutch 25 via the branch passage 48 from the oil passage 46 to increase the hydraulic pressure in the clutch 25, thus engaging or connecting the clutch 25 to the extent that depends on the hydraulic pressure buildup in the clutch 25.

Therefore, the torque from the engine 31 can be distributed to the righthand and lefthand rear road wheels dependent on the hydraulic pressure applied to the power cylinder 45. When the motor vehicle makes a turn, the drive torque applied to the outer rear road wheel (with respect to the turning circle) becomes higher than the drive torque applied to the inner rear road wheel, so that the turning performance of the motor vehicle is increased in medium and lower speed ranges.

Figure 6:
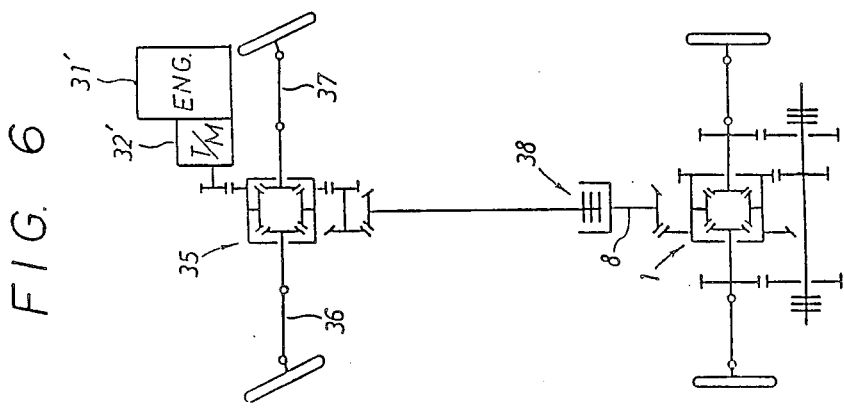
FIG. 6 is a schematic view showing a drive mechanism mounted in a motor vehicle having front and rear drive road wheels and an engine positioned at the front end of the motor vehicle.

FIG. 6 shows a drive system of a front and rear-wheel drive (4WD) motor vehicle. The motor vehicle includes a mechanical differential 35 coupled to front road wheels through respective drive axles 36, 37, an engine 31', a transmission 32', a mechanical differential 1 coupled to rear road wheels through respective drive axles, and a propeller shaft 8 including a front and rear torque split clutch 38 for transmitting drive power from the engine 31' via the front differential 35 to the rear differential 1. A road wheel driving apparatus of the present invention, which is identical to the apparatus shown in FIG. 1, is associated with the rear road wheels.

Figure 7:
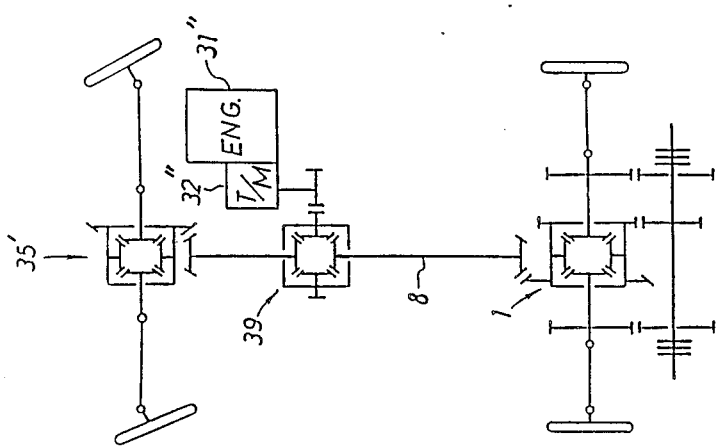
FIG. 7 is a schematic view showing a drive mechanism mounted in a motor vehicle having front and rear drive road wheels, an engine positioned at the center of the motor vehicle, and a central differential.

FIG. 7 shows a drive system of another front- and rear-wheel drive (4WD) motor vehicle. The motor vehicle includes a mechanical differential 35' coupled to front road wheels through respective drive axles, an engine 31", a transmission 32", and a mechanical differential 1 coupled to rear road wheels through respective drive axles. A propeller shaft 8 includes a mechanical differential 39 for transmitting drive power from the engine 31" via the differential 39 to the front and rear differentials 35', 1. A road wheel driving apparatus of the present invention, which is identical to the apparatus shown in FIG. 1, is associated with the rear road wheels.

Figure 11:
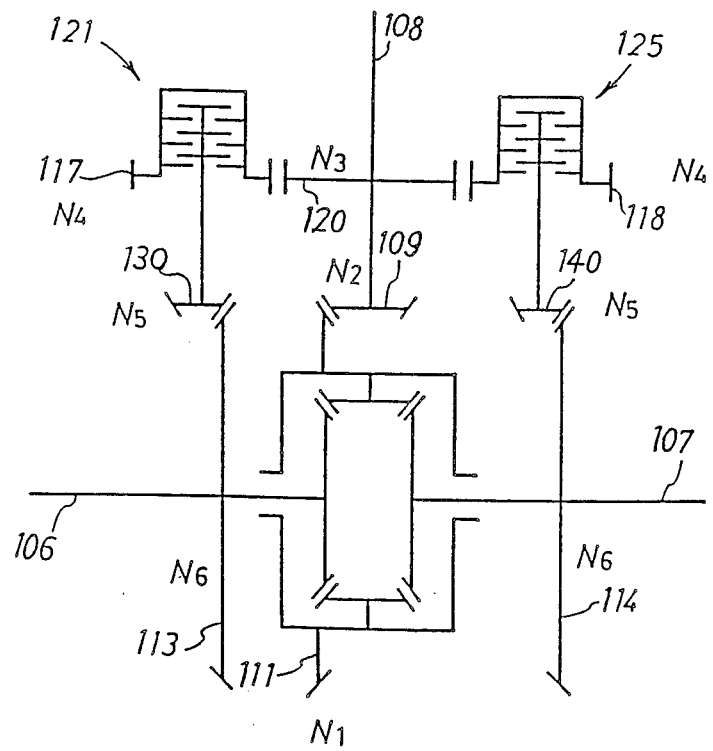
FIG. 11 is a schematic view of a modified drive mechanism with torque transmitting devices which are differently structured and positioned.

FIG. 11 illustrates a road wheel driving apparatus in which no countershaft is employed and a power transmitting shaft 108 has a gear 120. Drive power from an engine (not shown) is transmitted through the gear 120 to a pair of hydraulic multiplate clutches (torque transmitting clutches) 121, 125, gears 130, 140, and gears 113, 114 to output shafts 106, 107 coupled to road wheels (not shown), respectively.

The gears 113, 114 are identical each other, the gears 117, 118 are identical to each other, and the gears 130, 140 are identical to each other. The other details of the apparatus shown in FIG. 11 are the same as those of FIG. 1.

The number of teeth of a gear 111 is $N'_1$, the number of teeth of a gear 109 is $N'_2$, the number of teeth of the gear 120 is $N'_3$, the number of teeth of each of the gears 117, 118 is $N'_4$, the number of teeth of each of the gears 130, 140 is $N_5$, and the number of teeth of each of the gears 113, 114. These numbers of teeth meet the following relationship:

$$\frac{N'_1}{N'_2} > \frac{N'_4}{N'_3} \cdot \frac{N_6}{N_5}$$

When a motor vehicle incorporating the road wheel driving apparatus shown in FIG. 11 is making a turn, the apparatus is also capable of increasing the rotational speed of a selected outer road wheel (with respect to the turning circle) so as to be higher than the rotational speed of the inner road wheel.

Figure 8:
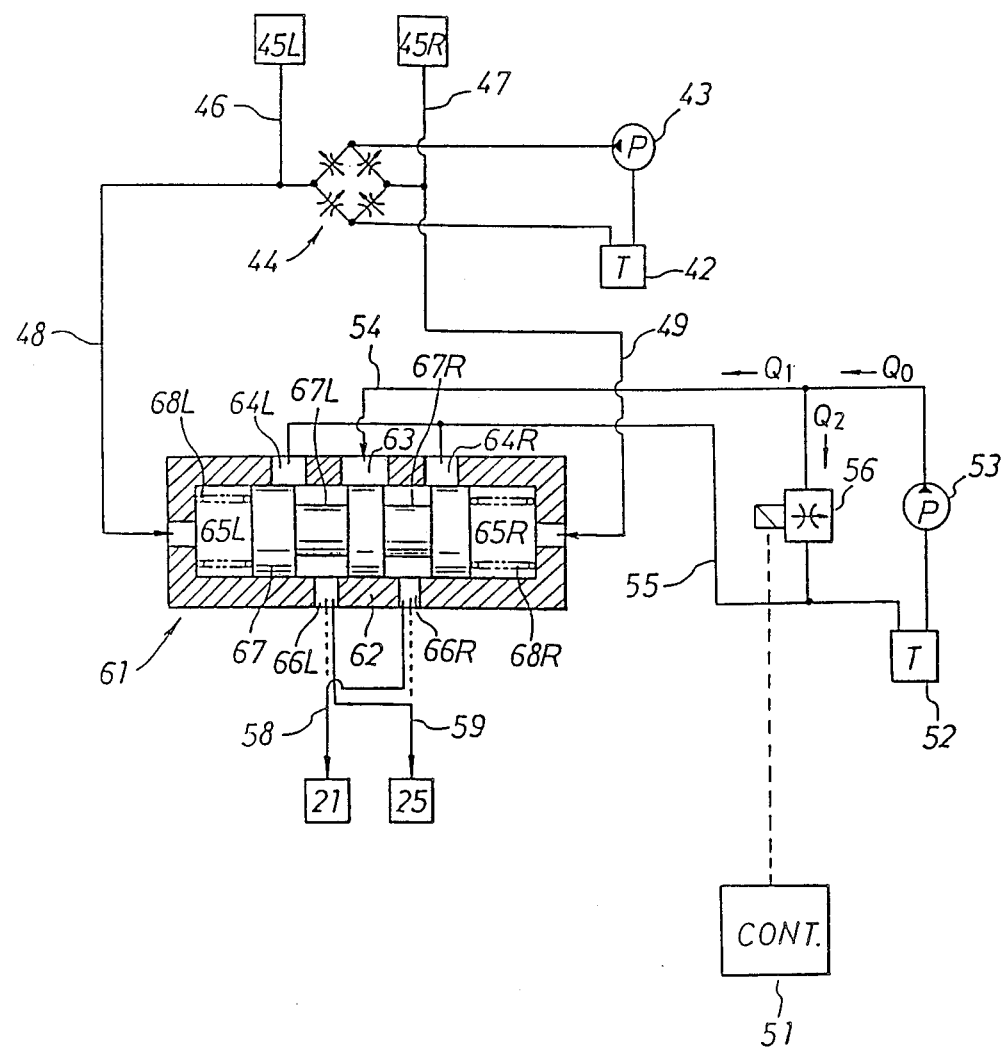
FIGS. 8 and 9 are of hydraulic pressure control circuits each with a spool valve.

FIG. 8 shows a hydraulic pressure control circuit which can be incorporated in the MR motor vehicle shown in FIG. 5 and the 4WD motor vehicle shown in FIG. 7.

The hydraulic pressure control circuit shown in FIG. 8 includes a control unit 51, an oil tank 52 for storing oil, an oil pump 53 for supplying hydraulic pressure from the oil tank 52 to the clutches, and a clutch control spool valve 61. The oil pump 53 is connected to the clutch control spool valve 61 by an oil supply passage 54, and the clutch control spool valve 61 is connected to the oil tank 52 by an oil return passage 55. A variable orifice 56 is connected between the oil supply passage 54 and the oil return passage 55. The variable orifice 56 is controlled by the control unit 51 to divide a certain amount $Q_2$ from an amount $Q_0$ of oil discharged by the oil pump 53 and returning the amount $Q_2$ of oil to the oil tank 52, while allowing a remaining amount $Q_1$ of oil to be supplied to the clutch control spool valve 61 at a rate proportional to the torque generated by the engine and the gear ratio of the transmission.

The clutch control spool valve 61 comprises a casing 62 and a spool 67 slidably disposed in the casing 62. The casing 62 has a central inlet port 63 connected to the oil supply passage 54 and a pair of spaced return ports 63 disposed one on each side of the inlet port 63 and connected to the oil return passage 55. The spool 67 is normally biased in a central neutral position in the casing 62 by a pair of springs 68L, 68R acting on the opposite ends, respectively, of the spool 67. The springs 68L, 68R are disposed respectively in oil chambers 65L, 65R defined in the casing 62 at the opposite ends of the spool 67. The oil chambers 65L, 65R are connected to the branch passages 48, 49, respectively, from the respective oil passages 46, 47 which connect the hydraulic pressure chambers 45 of the power cylinder and the four-way directional control valve 44 (see also FIG. 5). The casing 62 also has a pair of spaced outlet ports 66L, 66R connected to the hydraulic multiplate clutches 25, 21, respectively, through respective oil passages 59, 58. The spool 67 has a pair of axially spaced annular grooves 67L, 67R defined in its outer peripheral surface.

When the spool 67 is axially moved in a selected direction dependent on the hydraulic pressure applied from the branch passage 48 or 49, the amount $Q_1$ of oil from the oil pump 53 which is proportional to the engine torque and the transmission gear ratio is supplied via the groove 67L or 67R and the outlet port 66L or 66R to the hydraulic multiplate clutch 21 or 25 which is associated with the outer rear road wheel (with respect to the turning circle). Accordingly, the drive torque applied to the outer rear road wheel becomes higher than the drive torque applied to the inner rear road wheel in the manner described above for higher turning performance in medium and low speed ranges.

As indicated by the dotted lines in FIG. 8, the oil passages 58, 59 may be connected respectively to the outlet ports 66L, 66R for supplying the amount $Q_1$ of oil which is proportional to the engine torque and the transmission gear ratio to the hydraulic multiplate clutch 21 or 25 which is associated with the inner rear road wheel (with respect to the turning circle). With this arrangement, the drive torque applied to the inner rear road wheel becomes higher than the drive torque applied to the outer rear road wheel in proportion to a lateral G applied to the motor vehicle for higher running stability in a high speed range.

Figure 9:
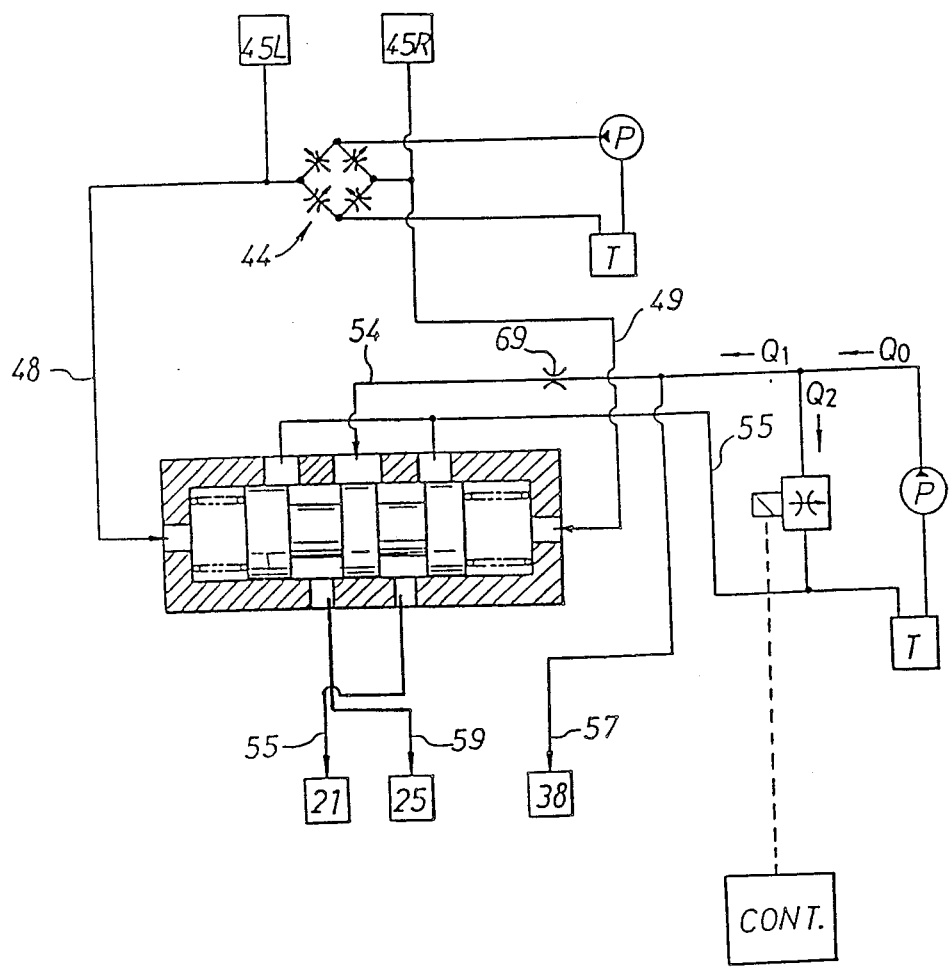

FIG. 9 illustrates a hydraulic pressure control circuit for use in a front- and rear-wheel-drive (4WD) motor vehicle having the front and rear torque split clutch 38 (FIG. 6).

The hydraulic pressure control circuit of FIG. 9 differs from the hydraulic pressure control circuit of FIG. 8 in that a branch passage 57 extends from the oil supply passage 54 and is connected to the front and rear torque split clutch 38, the oil supply passage 54 having a restriction.

The hydraulic multiplate clutches 21, 25 incorporated in the rear wheel drive system are selectively supplied with hydraulic pressure which has been controlled in the same manner as described with reference to FIG. 8, and also the front and rear torque split clutch 38 is supplied with the amount $Q_1$ of oil proportional to the engine torque and the transmission gear ratio.

In FIGS. 8 and 9, the spool valve 61 may be replaced with a solenoid-operated directional control valve for selectively increasing the rotational speed of an outer or inner road wheel when the motor vehicle makes a turn.

Figure 10:
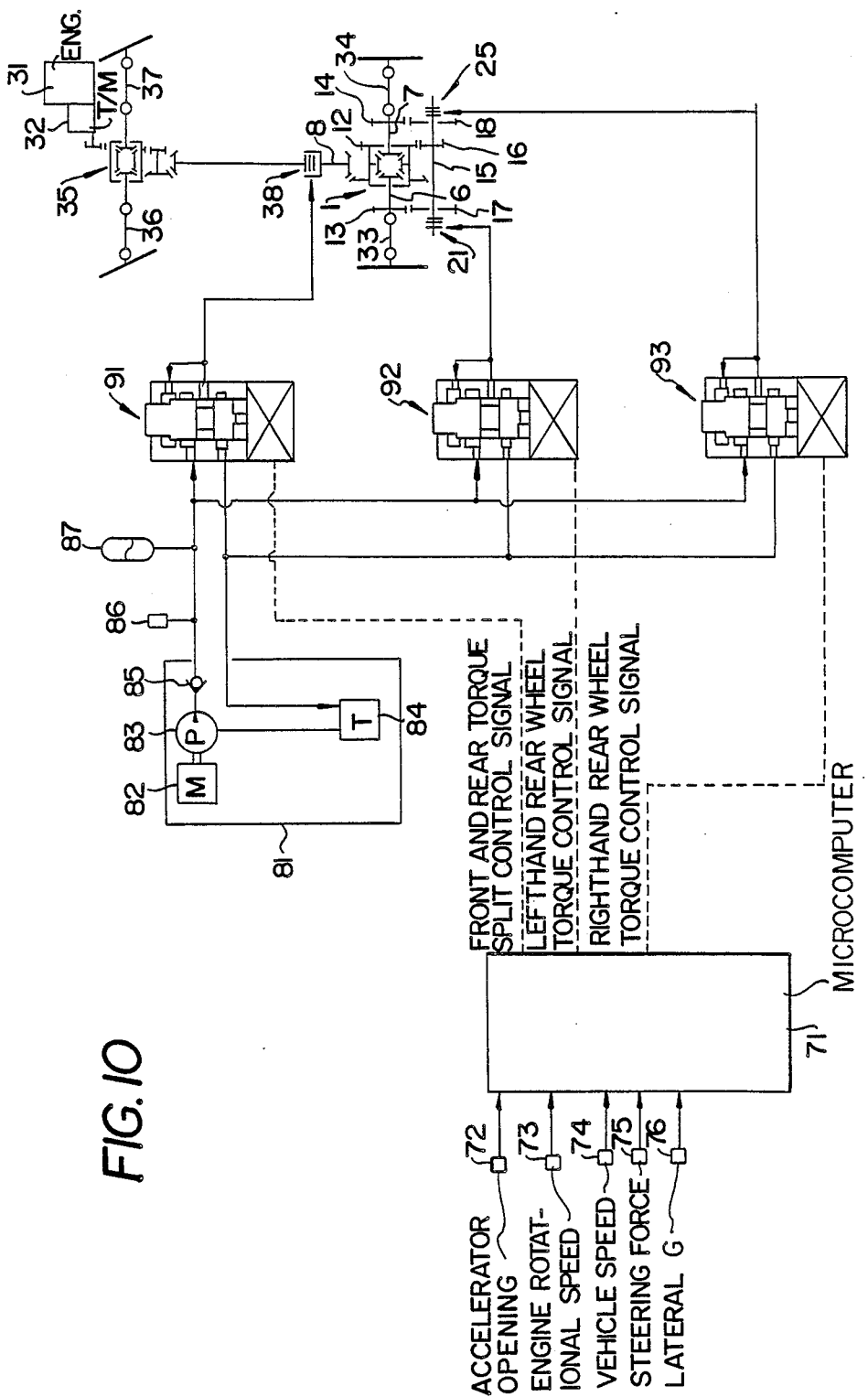
FIG. 10 is a schematic view of a control circuit for the motor vehicle shown in FIG. 6.

FIG. 10 shows a hydraulic pressure control circuit which may be employed in a front- and rear-wheel-drive (4WD) motor vehicle equipped with the front and rear torque split clutch 38. The hydraulic pressure control circuit has a microcomputer 71, a clutch oil pressure source 81, and pressure regulating valves 91, 92, 93. In FIG. 10, hydraulic pressure pipes or passages are indicated by the solid lines, and electric signals are represented by the dotted lines.

The microcomputer 71 is supplied with a signal indicative of an accelerator opening, typically a throttle valve opening, from an accelerator opening sensor 72, a signal indicating an engine rotational speed from an ignition pulse sensor 73, a signal representing a vehicle speed from a vehicle speed sensor 74, a signal representative of a steering force from a steering force sensor 75, and a signal indicating a lateral G from a lateral G sensor 76.

The clutch oil pressure source 81 comprises a motor 82, an oil pump 83, an oil tank 84, and a check valve 85, and is connected to a hydraulic pressure switch 86 and an accumulator 87. The pressure regulating valve 91 coupled to the torque split clutch 38, the pressure regulating valve 92 coupled to the hydraulic multiplate clutch 21 connected to the lefthand rear road wheel, and the pressure regulating valve 93 coupled to the hydraulic multiplate clutch 25 connected to the righthand rear road wheel, are connected to the clutch oil pressure source 81 parallel to each other.

Dependent on operating conditions of motor vehicle such as the accelerator opening, the engine rotational speed, the vehicle speed, the steering force, and the lateral G, the microcomputer 71 applies a front and rear torque split control signal, a lefthand rear road wheel torque control signal, and a righthand rear road wheel torque control signal to the pressure regulating valves 91, 92, 93, respectively, for regulating hydraulic pressures to be applied to the clutches 38, 21, 25, respectively.

The hydraulic pressure control circuit shown in FIG. 10 can control the hydraulic multiplate clutches 21, 25 independently of each other.

In the aforesaid embodiments, the gear ratios of the road wheel drive apparatus are selected such that the output shaft of a selected road wheel will be increased. However, these gear ratios may be selected such that the output shaft of a selected road wheel will be reduced to lower the rotational speed of an inner road wheel (on a turning circle) for improved turning performance in medium and low speed ranges, and to lower the rotational speed of an outer road wheel for increased running stability in a high speed range.

Although there have been described what are at present considered to be the preferred embodiments of the present invention, it will be understood that the invention may be embodied in other specific forms without departing from the essential characteristics thereof. The present embodiments are therefore &:o be considered in all aspects as illustrative, and not restrictive. The scope of the invention is indicated by the appended claims rather than by the foregoing description.

What is claimed is:

1. An apparatus for driving a pair of laterally spaced road wheels of a motor vehicle, comprising:
   a power source for producing a drive torque to drive the road wheels;
   first torque transmitting means for transmitting the drive torque from said power source to the road wheels;
   said first torque transmitting means including a differential for distributing the drive torque to the road wheels;
   second torque transmitting means for transmitting the drive torque from said power source to the road wheels in bypassing relation to said differential;
   said second torque transmitting means including clutch means for varying amounts of torque to be transmitted to the road wheels; and
   control means for controlling said clutch means while the vehicle is turning to differentiate an amount of torque to be transmitted to one of the road wheels with respect to an amount of torque transmitted to the other of the road wheels, dependent on an operating condition of the motor vehicle.

2. An apparatus according to claim 1, wherein said differential has a pair of first shafts extending transversely of said motor vehicle for transmitting the drive torque to said road wheels;
   said second torque transmitting means further including a second shaft extending parallel to said first shafts, first coupling means for coupling said power source and said second shaft at all times in bypassing relation to said differential, and second coupling means for coupling said second shaft to said first shafts;
   said clutch means being disposed between said second shaft and said second coupling means.

3. An apparatus according to claim 2, wherein said clutch means comprises a pair of hydraulic multiplate clutches mounted on said second shaft in torque transmitting relation to said first shafts, respectively.

4. An apparatus according to claim 2, wherein said first coupling means comprises a first gear mounted on a differential case of said differential and rotatable about said first shafts, and a second gear held in mesh with said first gear and integrally mounted on said second shaft;

said second coupling means comprising a pair of third gears rotatable about said second shaft, and a pair of fourth gears held in mesh with said third gears, respectively, and integrally mounted on said first shafts, respectively.

5. An apparatus according to claim 2, wherein said first coupling means comprises a second gear integrally mounted on said second shaft for transmitting the drive torque from said power source to a differential case of said differential;

said second coupling means comprising a pair of third gears rotatable about said second shaft, and a pair of fourth gears held in mesh with said third gears, respectively, and integrally mounted on said first shafts, respectively.

6. An apparatus according to claim 1, further including a power transmitting shaft having one end operatively connected to said differential for transmitting the drive torque from said power source to said differential;

said differential having a pair of first shafts extending transversely of said motor vehicle for transmitting the drive torque to the road wheels;

said second torque transmitting means being coupled between said power transmitting shaft and said first shafts.

7. An apparatus according to claim 6, wherein said second torque transmitting means has a fifth gear integrally mounted on said power transmitting shaft and a pair of sixth gears mounted on said first shafts, respectively;

said clutch means being operatively connected between said fifth gear and said sixth gears.

8. An apparatus according to claim 1, wherein said motor vehicle has a power steering system having a power cylinder, said clutch means being hydraulically operable and operatively coupled to said power cylinder.

9. An apparatus according to claim 8, wherein said control means comprises means for controlling said clutch means dependent at least upon the speed of travel of said motor vehicle.

10. An apparatus according to claim 1, wherein said control means comprises means responsive to said operating condition of the motor vehicle for increasing an amount of torque to be transmitted to one of said road wheels which is positioned on an outer side of a turning circle when the motor vehicle makes a turn.

11. An apparatus according to claim 1, wherein said control means comprises means responsive to said operating condition of the motor vehicle for increasing an amount of torque to be transmitted to one of said road wheels which is positioned on an inner side of a turning circle when the motor vehicle makes a turn.

12. An apparatus according to claim 1, wherein said clutch means of said second torque transmitting means is controllable by an external signal, and wherein said control means produces said external signal while the motor vehicle is turning.

* * * * *